(12) United States Patent
Burgmeier

(10) Patent No.: US 7,784,603 B2
(45) Date of Patent: Aug. 31, 2010

(54) GRIPPING DEVICE FOR CONTAINERS

(75) Inventor: Berthold Burgmeier, Dischingen/Eglingen (DE)

(73) Assignee: Krones AG, Neutraubling (DE)

( * ) Notice: Subject to any disclaimer, the term of this patent is extended or adjusted under 35 U.S.C. 154(b) by 231 days.

(21) Appl. No.: 12/065,081

(22) PCT Filed: Aug. 31, 2006

(86) PCT No.: PCT/EP2006/008505

§ 371 (c)(1),
(2), (4) Date: May 9, 2008

(87) PCT Pub. No.: WO2007/025747

PCT Pub. Date: Mar. 8, 2007

(65) Prior Publication Data

US 2009/0020394 A1    Jan. 22, 2009

(30) Foreign Application Priority Data

Sep. 3, 2005    (DE) .................. 10 2005 041 929

(51) Int. Cl.
*B65G 47/34* (2006.01)
(52) U.S. Cl. ............... 198/472.1; 198/468.5; 198/803.6
(58) Field of Classification Search ............ 198/469.1, 198/470.1, 472.1, 468.5, 867.04, 803.6; 294/88
See application file for complete search history.

(56) References Cited

U.S. PATENT DOCUMENTS 3,261,448 A * 7/1966 Heinz ................. 198/803.6
4,968,081 A * 11/1990 Beight et al. ........... 198/470.1
5,040,836 A * 8/1991 Roudaut ................ 294/88
5,375,898 A * 12/1994 Ohmori et al. ........... 294/88
6,076,875 A * 6/2000 Neff et al. ............. 294/88
6,386,609 B1 * 5/2002 Govzman ............... 294/88
6,626,476 B1 * 9/2003 Govzman et al. ......... 294/88

FOREIGN PATENT DOCUMENTS

| DE | 297 13 510 U1 | 8/1998 |
| DE | 103 25 137 A1 | 1/2005 |
| DE | 20 2005 002 924 U1 | 5/2006 |
| EP | 0 659 683 A1 | 6/1995 |

(Continued)

OTHER PUBLICATIONS

International Search Report based on Internatonal Patent Applicaton No. PCT/EP2006/008505; filed Aug. 31, 2006; Mailing Date: Apr. 17, 2008.

(Continued)

*Primary Examiner*—James R Bidwell
(74) *Attorney, Agent, or Firm*—Marshall, Gerstein & Borun LLP

(57) ABSTRACT

A gripper for containers, in particular for bottles, with at least first and second gripper arms (1, 2) which are mounted such that they can pivot and are acted on in the gripping pivoting direction by magnetically interacting permanent magnets such as, permanent magnets which simultaneously repel one another and attract one another are arranged in such a way that the sum of the repelling and attracting forces which act in the gripping pivoting direction on the gripper arms is substantially constant within a predetermined gripping range (d1 to d2) of the gripper which covers different container gripping sizes.

25 Claims, 2 Drawing Sheets

FOREIGN PATENT DOCUMENTS

| | | |
|---|---|---|
| EP | 0 858 963 A2 | 8/1998 |
| EP | 1 375 395 A1 | 1/2004 |
| JP | 01290229 A | 7/1990 |
| NR | 1 795 117 | 9/1959 |
| SU | 1 007 968 A | 3/1983 |
| SU | 1007968 | 3/1983 |

OTHER PUBLICATIONS

Database WPI Section PQ, Week 1984, Derwent Publications Ltd., London, GB; Class P62, AN 028803 [05] XP002233222 "Industrial Robot Gripper" & SU 1 007 968 A (Zharkov GE) Mar. 30, 1983 abstract; figures 1,2.

International Search Report based on International Patent Application No. PCT/EP2006/008505; filed Aug. 31, 2006; Mailing Date: Dec. 7, 2006.

"Antrag"—PCT Request, International Search Report, and Written Opinion; Filing Date: Aug. 31, 2006.

Derwent English translation of abstract of Russian Patent No. SU1007968, Mar. 1983.

* cited by examiner

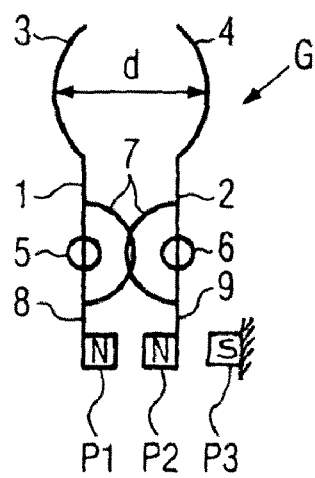
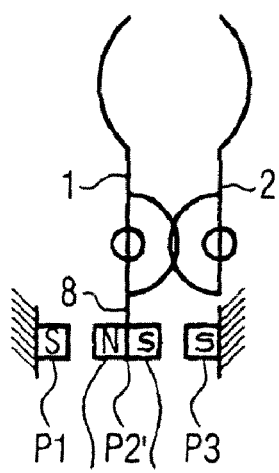
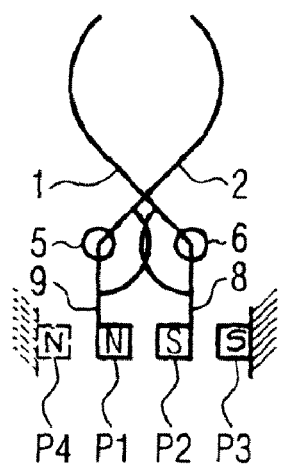
FIG. 1  FIG. 2  FIG. 3
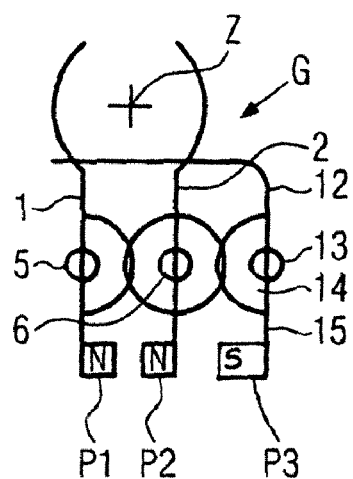
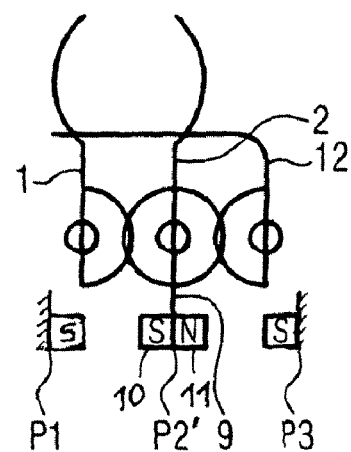
FIG. 4  FIG. 5
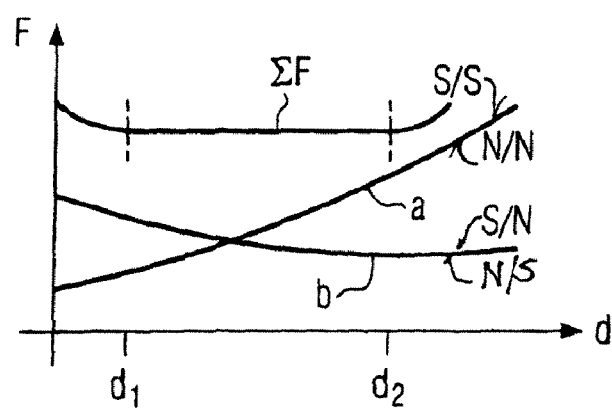
FIG. 6

GRIPPING DEVICE FOR CONTAINERS

CROSS-REFERENCE TO RELATED APPLICATION

The present application claims the benefit of priority of International Patent Application No. PCT/EP2006/008505, filed on Aug. 31, 2006, which application claims priority of German Patent Application No. 10 2005 041 929.1, filed Sep. 3, 2005. The entire text of the priority application is incorporated herein by reference in its entirety.

FIELD OF THE DISCLOSURE

The disclosure relates to a gripping device of the type used in container transport systems, such as in beverage bottling operations.

BACKGROUND

Such gripping devices, i.e. so called clamp-down grippers, are employed in container transport systems or container handling systems in mechanically controlled installations or in uncontrolled installations activated by the loading and unloading of containers. Mechanically controlled clamp-down gripping devices are known for example from EP 0 659 683A. Container operated clamp-down grippers are known from DE 297 13 510 U. The gripper devices are frequently actuated by an accumulator, for example in the swivel direction of the gripper device and the accumulator may comprise elastomer-, spiral- or compression springs.

Container transport systems, in particular bottle transport systems must satisfy high demands in regard to microbiological conditions and sanitation and must be functionally safe over an extended service life and with high work frequency rate. Because of the drawbacks of mechanical springs, the suggestion has already been made in bottle transport technology to use magnetically cooperating permanent magnets as magnetic springs, which offer benefits in regard to the microbiological conditions, sanitation and service life.

Even though permanent magnets ensure an exactly adjustable gripping force for a single gripper size of a container, they nevertheless have the drawback, the same as mechanical springs, of not generating uniform gripping forces when one and the same gripper is used for different gripper sizes of containers within a specified gripper range, based on a progressive or regressive characteristic line. It would, however, be desirable, regardless of the respective gripper size, to clamp down on each container with the same gripper force. According to experience, gripper size within the gripper range varies, for example, between diameters of approximately 24 mm to 38 mm, in particular with respect to plastic bottles such as PET bottles. Until now it has not been possible to solve the problem of altering the gripping forces for one and the same gripper device to accommodate different gripper sizes.

SUMMARY OF THE DISCLOSURE

The disclosure is based on the object of disclosing a gripping device of the above mentioned type which produces, independently of the different container gripper sizes, an at least essentially uniform gripper force for secure holding of the containers.

As a result of combining concurrently operating, reciprocally repelling and attracting permanent magnets in such manner that with relative movements of the permanent magnets the sum of the repulsive and attractive forces is, at least in essence, constant, when the gripper arms move away from each other or towards each other, the same gripper force within the scope of the gripper range is always generated for the different gripper sizes. To the same degree that the percentage of the gripping force is decreased for example from repulsive force, there occurs an increase in the percentage of the gripping force resulting for example from attractive force. Thus, containers having different gripper sizes are held equally securely.

Each permanent magnet provided is bipolar having a magnetic north pole N and a magnetic south pole S. Each permanent magnet can simultaneously cooperate magnetically with two additional appropriately positioned bipolar magnets in such manner so that each of its poles cooperates with an antipole (attractive) or a like pole (repulsive) of another permanent magnet. Among other considerations, in order to safeguard well-defined magnetic conditions, one concept is given preference in which a permanent magnet, which simultaneously cooperates with two additional permanent magnets, consists of two bipolar permanent magnetic bodies, which point toward each other with their antipoles. These antipoles are appropriately separated by means of an inter-positioned separation element and can be rendered passive by same, so that only the two other poles, each of which points to another permanent magnet, are magnetically active. Each additional permanent magnet which cooperates with a permanent magnet could be an individual bipolar permanent magnetic body. Expediently, the other permanent magnets however are also designed analogously, i.e. they consist of two bipolar permanent magnetic bodies, of which, if so required, only one employs an active pole for magnetic cooperation.

In a specific embodiment, the permanent magnets are designed and arranged in such manner that with respect to the relative reciprocal movements between the mutually repelling and mutually attracting permanent magnets, the sum of the flux densities in the magnetic fields of the permanent magnets is essentially constant, at least within the specified gripping range, which covers the different standard container sizes.

In a specific embodiment, first and second permanent magnets having like, mutually repelling polarities or opposite, mutually attracting polarities, are joined to gripper arms or to gripper arm extensions attached to same. A third permanent magnet is aligned with one of the first and second permanent magnets. Said third permanent magnet has the opposite polarity with respect to first and second mutually repelling permanent magnets, and the same polarity with respect to first and second mutually attracting permanent magnets as the first or the second permanent magnet. If two mutually repelling permanent magnets approach each other under magnification of repulsive force, there occurs at the same time, due to the relative distance of the mutually attracting permanent magnets, a corresponding decrease in the attractive force, and vice versa.

For support and/or moderation of the power course, a fourth permanent magnet may even be aligned relative to the respective other of the first and second permanent magnets.

In this arrangement it is useful to mount the third and preferably also the fourth permanent magnet in fixed position, while the first and second permanent magnets with their gripper arms and gripper arm extensions are in motion when the gripper arms rotate.

In an alternative specific embodiment, the third permanent magnet is connected to a third pivotally positioned gripper arm or with said gripper arm's extension. The third gripper arm is useful for containers having different gripper sizes, so that the center of each captured container can be positioned in the same location, for example in relation to the swivel bearings of the gripper arms. That approach is of benefit, for example, in container filling plants so that it is possible to respectively insert the filling valve in proper fashion. In order for the third gripper arm to correctly cooperate with the first and second gripper arms, it is rotationally coupled in counter-rotating direction to one of the first and second gripper arms, so that all gripper arms can only execute pre-determined movements relative to each other.

In a further alternative specific embodiment, a third rotationally positioned gripper arm is likewise provided and rotationally coupled in counter-rotating direction with one of the first and second gripper arms. A permanent magnet is arranged at only one of the first and second gripper arms or its gripper arm extension; that permanent magnet comprising two bipolar permanent magnetic bodies and operating with opposing active polarities. Two additional permanent magnets respectively having the same active polarities as the allocated active polarity of the second permanent magnet are arranged in fixed fashion on both sides of the second permanent magnet. Only the second permanent magnet, which comprises the two permanent magnetic bodies, and including, perhaps, an inter-positioned separation element, moves with the one gripper arm and relative to the other, stationary permanent magnets.

The first and third (or fourth) permanent magnet can also, in view of clearly defined magnetic conditions, comprise two permanent magnetic bodies and respectively requires for cooperation with the second permanent magnet only one active polarity or only one active pole.

The third gripper arm is impinged in one direction by the magnetic force, for example from the side of the swivel bearings of the gripper arms for engagement with a gripper aperture defined between the first and second gripper arms in order to produce the centering effect for the captured container.

The gripper arms should respectively be rotationally coupled in opposite direction in order for the gripper to assume a defined gripper position. For counter-directional rotational coupling, gear wheels or gear segments, arranged at the swivel bearings, can respectively mate or mesh in pairs.

For rendering passive the unneeded poles or polarities of the bipolar permanent magnetic bodies, a separation element may respectively be inter-positioned as needed. If so required, a magnetic end body is also employed.

In order to attain high performance density and long service life periods, it is useful if the permanent magnets or permanent magnetic bodies are highly productive and contain at least a predominant amount of rare earths or ferrite or chemical elements of the third group of the periodic system or lanthanides.

The dimensions of the permanent magnets or permanent magnetic bodies may be of like or of different size. They may be in the shape of circular discs, for example. Other geometrical shapes are also possible, such as cubes, blocks or rods.

In one specific embodiment, in which only the second permanent magnet is arranged at a gripper arm extension and the first and third permanent magnets are positioned in stationary fashion, it is possible to select the disc diameters of the second permanent magnets smaller or larger and the disc diameter with respect to the first and third permanent magnets, preferably mostly larger. On the other hand, the disc diameter of the second permanent magnet may be smaller than for the first and third permanent magnets if all three permanent magnets are arranged on gripper arm extensions.

In regard to satisfactory microbiological conditions and for cleaning cycles involving, where required, aggressive media for the permanent magnets or because of critical properties of the permanent magnets for food standards, it is advisable to encapsulate the permanent magnets or the permanent magnetic bodies in non-magnetic material, preferably high-quality steel.

BRIEF DESCRIPTION OF THE DRAWINGS

Specific embodiments of the subject of the disclosure are explained with the aid of the drawings. The drawings depict the following:

FIG. 1 schematically depicts a first specific embodiment of a gripping device with two gripper arms, FIG. 2 schematically depicts another specific embodiment of a gripping device with two gripper arms, FIG. 3 schematically depicts a further specific embodiment of a gripping device with two gripper arms, FIG. 4 schematically depicts a further specific embodiment of a gripping device with three gripper arms, FIG. 5 schematically depicts a further specific embodiment of a gripping device with three gripper arms, FIG. 6 depicts a diagram of the gripping force or magnetic forces above the gripping size of the container.

DETAILED DESCRIPTION OF THE PREFERRED EMBODIMENTS

Figure 7:
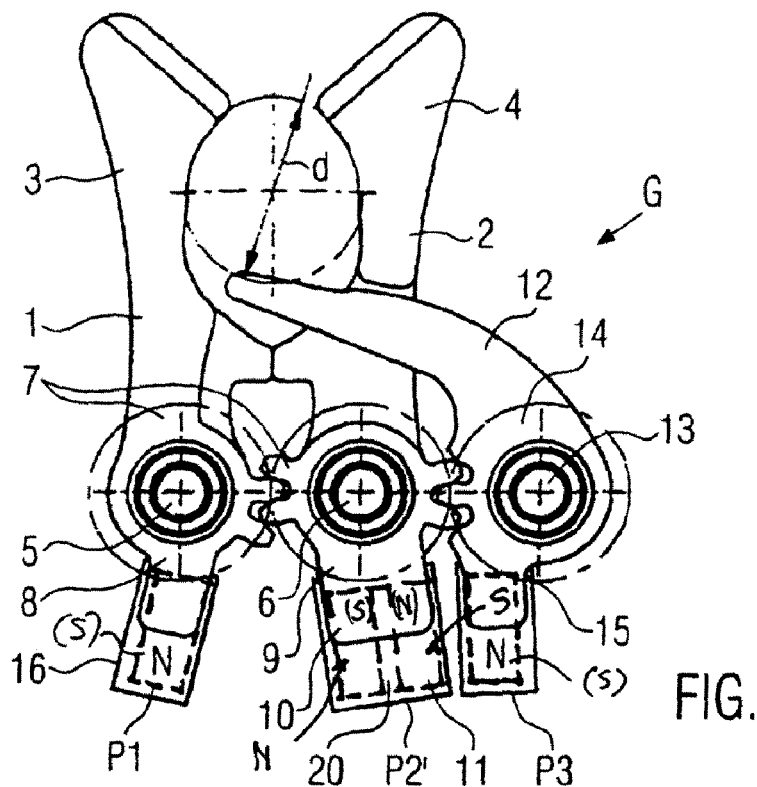
FIG. 7 depicts a bird's eye view of a concrete embodiment of a gripping device, approximately corresponding to FIG. 4.

A schematic diagram is shown in FIG. 1 of a gripping device G, a so-called clamp-down gripper for container transport systems or container handling systems, in particular for bottles, and presents first and second gripper arms 1, 2 with gripper ends 3, 4 defining a gripper aperture, said gripper ends 3, 4 being pivotally positioned on remotely located swivel bearings 5, 6 and having gripper arm extensions beyond the swivel bearings. The gripper arms 1, 2 are shown, for example, in a gripper position for a gripper size d. The two gripper arms 1, 2 are rotationally coupled in the opposite direction via gear wheels or gear wheel segments 7 provided at the swivel bearings 5, 6. At the gripper arm extensions 8, 9 is respectively arranged a first permanent magnet P1 and a second permanent magnet P2. The first and second permanent magnets P1 and P2, facing each other, have the same polarities, for example N, and repel each other. A third, stationary permanent magnet P3 is aligned vis-à-vis the second permanent magnet P2, whose active polarity (S) is opposite of the active polarity (N) of the second permanent magnet P2, so that, concurrently, the second and third permanent magnets P2, P3 attract each.

The permanent magnets P1, P2 and P3 are designed and arranged in such manner so that when relative movements between the permanent magnets occur based on the working movements of gripping device G, the sum of the repulsive and attractive forces is essentially constant. This will be explained with the help of FIG. 6.

On the vertical axis of the diagram in FIG. 6 is plotted the gripping power F or the force respectively generated by two permanent magnets, while the horizontal axis represents the gripper size d. With increasing gripper size d, the repulsive force (curve a; S/S or N/N) increases between the first and second permanent magnets P1, P2. On the other hand, with increasing gripper size d, the attractive force between the second and third permanent magnets P2, P3 (curve b, S/N; N/S) decreases at the same time. The sum (upper curve ΣF in FIG. 6) of the attractive and repulsive forces is essentially constant within a pre-determined gripping range, for example between d1 and d2. The gripping range d1 to d2 covers, for example, bottle gripping sizes or bottle diameters between 24 mm and 38 mm (measured, for example, at the bottle neck).

The specific embodiment in FIG. 2 also presents the first and second gripper arms 1, 2. Only gripper arm 1 has a gripper arm extension, at which is arranged the second permanent magnet P2', which consists of two bipolar permanent magnetic bodies 10, 11, whose opposite polarities N and S are active. The first and the third permanent magnet P1, P3 are oriented towards the second permanent magnet P2' and are arranged in stationary fashion in such manner that the first permanent magnet P1 and the second permanent magnet P2' attract each other and, concurrently, the third permanent magnet P3 and the second permanent magnet P2' repel each other. The effect is the same as in the specific embodiment in FIG. 1.

The specific embodiment in FIG. 3 presents over-crossed first and second gripper arms 1, 2, each of which having a gripper arm extension 8, 9 at which are arranged the first and second permanent magnets P1, P2 with opposite active polarities N, S. To the second permanent magnet P2 is assigned the third permanent magnet P3, which is stationary and has the same active polarity S. There may even be a fourth permanent magnet P4 with the same active polarity N aligned vis-à-vis the first permanent magnet P1 (indicated by dotted lines). The first and second permanent magnets P1, P2 attract each other while concurrently the second and third and the first and fourth permanent magnets repel each other.

In the gripping unit G in FIG. 4, the same as in FIG. 1, the first and second gripper arms 1, 2, designed with swivel arm extensions, can be tilted in their swivel bearings 5, 6.

Additionally, a third swivel arm 12 is pivotally positioned in its own swivel bearing. The swivel bearings 5, 6, 13 are located, for example, on one line. The third swivel arm engages from the direction of the side of the swivel bearings 5, 6, 13 with the gripping aperture between the gripper ends of the first and second gripper arms 1, 2 and has a gripper arm extension 15. Bipolar permanent magnets P1, P2, P3 are arranged at the three gripper arm extensions, with the first and second permanent magnets P1, P2, having the same active polarities N, N, being aligned towards each other, while the third permanent magnet P3 possesses the opposite active polarity S and is aligned towards the second permanent magnet P2.

In the specific embodiment in FIG. 5, there is provided, similarly to FIG. 4, a third gripper arm 12 in addition to the first and second gripper arms 1, 2. Only the second gripper arm 2 has a gripper arm extension 9. On that gripper arm extension 9 is arranged the second permanent magnet P2', which comprises, the same as in FIG. 2, two permanent magnetic bodies 10, 11 and has opposite active polarities (S, N). The first and third permanent magnets P1, P3 are aligned towards the second permanent magnet P2 and are respectively positioned in stationary fashion. The first and second permanent magnets P1, P2 repel each other, whereas the third and second permanent magnets P2, P3, attract each other.

In FIG. 1 to 5, the permanent magnets are symbolically depicted with only one polarity, even though said arrangement respectively involves bipolar permanent magnets or permanent magnetic bodies. In other words, in each case only the active polarity (N or S) for the gripper operating function is indicated, but not the other, possibly rendered passive pole or the other passive polarity.

The concrete specific embodiment of gripping device G depicted in FIG. 7 largely corresponds to the schematic embodiment of FIG. 4. The second permanent magnet P2' comprises two bipolar permanent magnetic bodies 10, 11 and is contained in an encapsulation 16, of high-grade steel, for example. As indicated for the second permanent magnet P2', a separation element 20 may be provided between the permanent magnetic bodies 10, 11, which renders passive the poles facing each other ((S) (N)), so that only the N poles (to the left) and the S poles (to the right) are active. The first and second permanent magnets P1, P2' repel each other, whereas the second and third permanent magnets P2' and P3 attract each other. All three permanent magnets P1, P2' and P3 move with the gripper arms 1, 2, 12. The first and third permanent magnets P1, P3 respectively comprise in this case only a bipolar permanent magnetic body, for example in the shape of a disc, and they respectively have only one active polarity.

Figure 8:
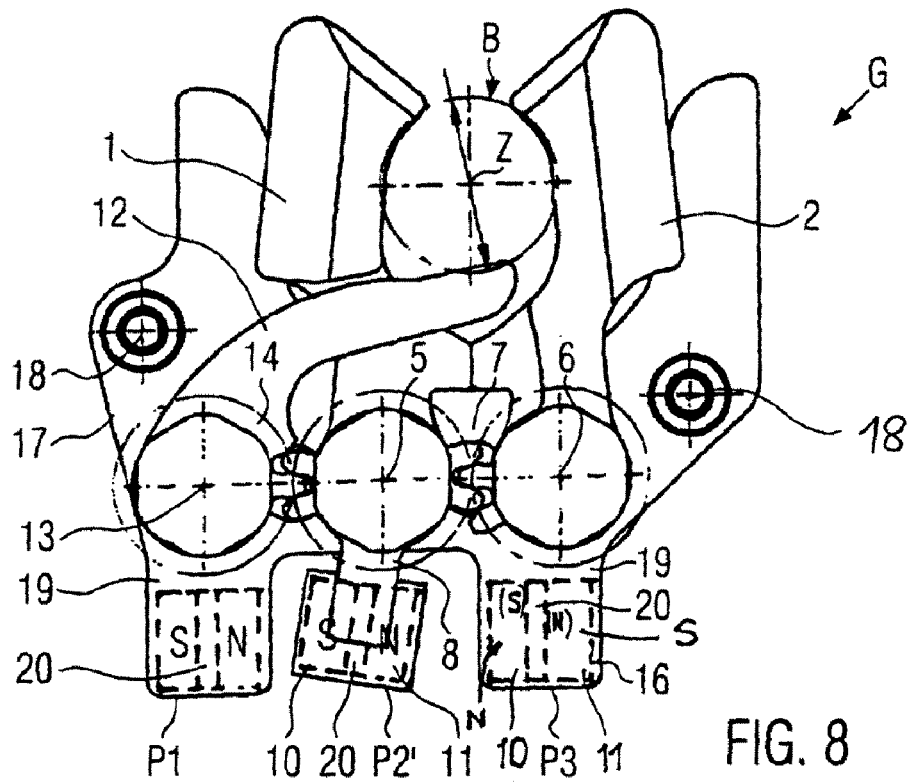
FIG. 8 depicts a bird's eye view of a concrete embodiment of a gripping device, approximately corresponding to FIG. 5.

In the concrete specific embodiment of the gripping device G in FIG. 8, which essentially corresponds to the schematically indicated gripper in FIG. 5, the swivel bearings 5, 6, 13 are arranged on a base plate 17, which is fixed at attachment spots 18 in the container transport system or the container handling system, for example, on the rotor of a bottle filling machine or a material handling turnstile. The base plate has on the side facing away from the gripper arms 1, 2—two projecting abutments 19, on which are arranged, in stationary manner, the first and third permanent magnets P1, P3, respectively comprising two bipolar permanent magnetic bodies 10, 11. The first gripper arm 1 is fitted with gripper arm extension 8, which is off-set for example in downward direction, and the second permanent magnet P2', comprising the two bipolar permanent magnetic bodies 10, 11 and the separation element 20 and has opposing active polarities S, N. In this specific embodiment, the first and third permanent magnets P1, P3 also respectively comprise two bipolar permanent magnetic bodies 10, 11 and a separation element 20 in encapsulations 16.

The above described gripping devices G may be control-operated or manually manipulated. If manually manipulated, it means that they are opened by inserting the container B against the gripping force and that they assume their gripping position automatically, and for removal of the container they are forced apart by wedge effect. Alternatively, the represented gripping devices, however, can also be controlled mechanically (not shown), i.e. they can be opened by sliding block arrangement or cam gear against the gripping force and closed under gripping power, in order to be able to insert or remove a container B.

The permanent magnets are designed and arranged in such manner that the sum of flow densities in the magnetic fields with relative movements is essentially constant, at least within the pre-determined gripper range d1 to d2. As a result, the gripping force placed upon the container B is always the same, at least essentially the same, independent of the gripping size of container B.

The permanent magnetic bodies 10, 11 are circular discs, for example, whose diameters and thicknesses can be uniform or different. Preferred are high-performance permanent magnets which are produced for example, using predominant amounts of rare earth elements, which are also known as lanthanides, such as neodymium and samarium, oxides of rare earth elements also known as rare earths, ferrite, or chemical elements of the third group of the periodic system.

Instead of the earlier described swivel arrangement of the gripper arms, a parallel displaceable bearing is also possible. Moreover, one gripper arm may be designed stationary and only the other magnetically manipulated gripper arm designed movable.

The invention claimed is:

1. Gripping Device (G) for containers (B), in particular for bottles in container transport systems or container handling systems, comprising at least two relative to each other movable gripper arms, the gripper arms being impinged in gripper direction by magnetically cooperating permanent magnets (P1, P2, P3, P4), the permanent magnets simultaneously repelling and attracting each other, the permanent magnets being designed in such manner and arranged movably relative to each other by the working motion of the gripping device (G) that the sum is essentially constant of the repulsive and attractive forces acting in grip direction on the gripper arms within a pre-determined grip range (d1 to d2) covering various container grip sizes, wherein the first and second permanent magnets (P1, P2) have one of like, mutually repelling polarities (N, N; S, S) or opposing, mutually attracting polarities (N, S; S, N), the first and second permanent magnets (P1, P2) are connected with one of grippers arms or gripper arm extensions, at least a third permanent magnet (P3, P4) is aligned with one of the first or second permanent magnets (P1, P2), and the third permanent magnet (P3), with repelling first and second permanent magnets and with attracting first and second permanent magnets, operates with the same polarity as the assigned first or second permanent magnet.

2. Gripping Device according to claim 1, wherein the permanent magnets are designed and arranged in such manner that within the pre-determined grip range (d1, to d2) the sum of the flow densities is essentially constant in the magnetic fields of the repelling and attracting permanent magnets.

3. Gripping Device according to claim 1, and a fourth permanent magnet (P4) having the same or the opposite polarity is aligned to the other of the first and second permanent magnets (P1, P2).

4. Gripping Device according to claims 1, wherein the position of the third permanent magnet (P3) is stationary.

5. Gripping Device according to claim 1, and wherein the third permanent magnet (P3) is connected with one of a third pivotally positioned gripper arm or a gripper arm extension thereof, and the third gripper arm is coupled, in counter-rotating fashion, to one of the first and second gripper arms.

6. Gripping Device according to claim 1, and a third pivotally positioned gripper arm which is coupled in counter-rotating fashion with one of the first and second gripper arms, a second permanent magnet (P2') comprising two bipolar permanent magnetic bodies and presenting opposite active polarities is arranged at only one of the first and second gripper arms or a gripper arm extension thereof, and that the first and third permanent magnet (P1, P2) with like active polarity as that of the respectively confronted bipolar permanent magnetic body of the second permanent magnet (P2') are arranged in stationary fashion on both sides of the second permanent magnet (P2').

7. Gripping Device according to claim 6, wherein the first and the third permanent magnet (P1, P3) comprise two bipolar permanent magnetic bodies and present opposite active polarities.

8. Gripping Device according to claim 1, wherein the third gripper arm is impinged by magnetic power from the side of swivel bearings of the first, second and third gripper arms in one direction for engagement with a grip aperture defined between the first and second gripper arms.

9. Gripping Device according to claim 1, wherein the gripper arms are respectively rotationally coupled in pairs, in opposite direction, by means of one of meshing gear wheels or gear wheel segments arranged on swivel bearings.

10. Gripping Device according to claim 6, and at least one separation element is provided within each permanent magnet (P1, P2', P3, P4) comprising two bipolar permanent magnetic bodies between the poles of the bipolar permanent magnetic bodies having opposite polarities.

11. Gripping Device according to at least one of the preceding claims, wherein the permanent magnets or the bipolar permanent magnetic bodies contain one of, rare earths elements, oxides of rare earth elements, ferrite, and chemical elements of the third group of the periodic system or lanthanides.

12. Gripping Device according to claims 1, wherein the permanent magnets have dimensions of one of equal or different size.

13. Gripping Device of claim 12, wherein the permanent magnets are circular discs.

14. Gripping Device according to claim 1, wherein the permanent magnets are encapsulated in non-magnetic material.

15. Gripping Device according to claim 3, wherein the position of the fourth permanent magnet (P4) is stationary.

16. Gripping Device according to claim 6, wherein the third gripper arm is impinged by magnetic power from the side of swivel bearings of the first, second and third gripper arms in one direction for engagement with a grip aperture defined between the first and second gripper arms.

17. Gripping Device according to claim 6, wherein the bipolar permanent magnetic bodies contain one of rare earth elements, oxides of rare earth elements, ferrite, and chemical elements of the third group of the periodic system.

18. Gripping Device according to claim 13, wherein the disc diameter of the second permanent magnets (P2') is one of smaller or larger than that of the first and third permanent magnet (P1, P3).

19. Gripping Device according to claim 6, wherein the bipolar permanent magnetic bodies have dimensions of one of equal or different size.

20. Gripping Device according to claim 12, wherein the bipolar permanent magnetic bodies are circular discs.

21. Gripping Device according to claim 6, wherein the bipolar magnetic bodies are encapsulated in non-magnetic material.

22. Gripping Device according to claim 1, wherein the permanent magnets are encapsulated in high-grade steel.

23. Gripping Device according to claim 6, wherein the bipolar permanent magnetic bodies are encapsulated in high-grade steel.

24. Gripping Device According to claim 11, wherein the permanent magnets contain one of neodymium or samarium.

25. Gripping Device according to claim 17, wherein the bipolar permanent magnetic bodies contain one of neodymium or samarium.

* * * * *